Patented Sept. 25, 1945

2,385,558

UNITED STATES PATENT OFFICE 2,385,558

ELECTRIC POWER CABLE

John Krauss Webb, London, W. C. 2, England, assignor to International Standard Electric Corporation, New York, N. Y.

No Drawing. Application February 11, 1938, Serial No. 190,053. In Great Britain March 19, 1937

9 Claims. (Cl. 174—23)

This invention relates to electric power cables and has for its object to provide improved barriers therein and improved methods of utilising styrene or a similar polymerisable material in the application of joints, plugs or terminations in power cables of the impregnated type and the generic expression "barrier" when employed in this specification is intended to include joints, plugs and terminations.

The present invention is particularly applicable to be used in conjunction with the barriers disclosed in U. S. Patents Nos. 2,105,567; 2,209,894; and 2,209,895 which cover the provision of styrene barriers in the form of joints, terminations and plugs in electric power cables.

When it is desired to make a styrene joint, plug, or termination in a cable system which has insulation consisting of paper impregnated with oil due regard must be paid to the following consideration. There is a tendency for oil from the cable insulation to seep into the barrier before it is polymerised and contaminate the styrene. At the interface of the barrier insulation and the cable insulation the styrene and oil are of necessity mixed together so that there is no sudden transition from oil to styrene with the result that after polymerisation (in conjunction with, for example, chlorinated diphenyl) the oil-impregnated insulation is merged into the polystyrene. This effect is advantageous both from the electrical and mechanical points of view, but any excess of oil which finds its way into the barrier is detrimental. For example, excess of oil, results in a very much increased time of polymerisation which is inconvenient. It also results in the compound produced being too plastic so that the hydraulic resistance of the barrier is impaired.

Some amelioration may be obtained by swaging the cable sheath in the vicinity of the barrier and/or by freezing the cable on either side of the joint with carbon dioxide ($CO_2$) snow.

The present invention aims to overcome this difficulty in the application of a polymerisable material such as styrene to impregnated cables, e. g., oil impregnated cables, caused by the necessity for replacing the original impregnant in the cable by the polymerisable material. This material belongs to a class which may be generally described as readily polymerizable aromatic hydrocarbons of the vinyl type for which the general monomeric formula may be set down as follows:

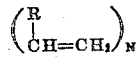

where R is any aromatic hydrocarbon radical which contains less than four benzene rings and N is the number of vinyl groups attached to the aromatic radical. Briefly stated, the invention consists in removing the original impregnant, e. g., oil from that part of the cable where it is desired to apply the polymerisable material, e. g., styrene to complete the joint, termination or plug, by dissolving out the oil in a suitable solvent such as benzene. The solvent may be boiled off and replaced by monomeric styrene which is subsequently polymerised in situ as described in the aforesaid prior patents.

The preferred method is to flush the insulation originally with benzene ($C_6H_6$) or other suitable volatile solvent. The solvent, held initially below its boiling point dissolves out considerable quantities of oil and means are provided for drawing off the mixture of solvent and oil until substantially pure solvent is passing through the cable or barrier. The heating may then be increased, so that temperatures in excess of the boiling point of the solvent (which may be under reduced pressure due to the evacuation or suction at the drawing-off point) are attained and the solvent is thus boiled off.

The solvent is then replaced by monomeric styrene, i. e., the cable or barrier is reimpregnated with monomeric styrene. Polymerisation is then effected.

In order that the invention may be clearly understood reference will now be made in more detail to the application of the present invention to the joints, plugs and terminations described in the aforementioned patents.

In the cable plugging process described in U. S. Patent No. 2,209,895 the oil resisting plug or termination was provided by introducing a polymerisable material, for example styrene, into the cable insulation by means of tappings or openings in the metal sheath and thereafter polymerising the material to form a plug in the cable. A difficulty which has now become apparent is that in the course of the replacement of the oil with the styrene the latter tends to polymerise with the result that the nipples may become choked with polystyrene before sufficient oil has been replaced.

The above difficulty may be overcome in accordance with the present invention by first of all feeding a suitable solvent into the cable instead of feeding in styrene. In this manner the oil at that part of the cable at which the plug is to be formed is replaced by the solvent (e. g., benzene $C_6H_6$); thereafter the solvent may be boiled off and monomeric styrene fed into the cable. In addition to the adjustment of the oil content, the following advantages are obtained:

1. A saving in monomeric styrene (which is more expensive than benzene) since no styrene contaminated with oil need be drawn off.

2. Polymerisation of the styrene during oil displacement is avoided with a resultant gain of efficiency in the process. In addition to the advantages specified above in the process of forming oil resisting plugs or terminations in oil impregnated cables, the present invention also renders possible a simplification in the preparation of a cable joint. The joint described in my Patent No. 2,105,567 involves the use of paper tapes impregnated with monostyrene which comprises the added insulation. Difficulties are experienced in connection with the storing and transportation of paper tapes impregnated with monomeric styrene, because unless they are pre-polymerised there is a tendency for partial polymerisation to take place during storage or transportation and unless the papers are kept at a low temperature the styrene will partially polymerise to a degree which renders the papers unusable.

Suitable apparatus for carrying out the various methods in accordance with the present application are illustrated in my Patent No. 2,213,875, dated September 3, 1940, which patent was filed on even date with the present application and the claims of which are directed to a different invention from the claims of the present application.

The present invention gives various alternative methods by means of which styrene joints may be produced and the above difficulties overcome. One method is to use ordinary oil impregnated tapes in making the joint and thereafter to replace the oil with styrene in the manner described above in connection with U. S. Patent No. 2,209,895. It is therefore now possible to use ordinary oil-impregnated paper or papers impregnated with any desired compound, e. g., resin oil, chlorinated diphenyl, chlorinated naphthalene or preferably methyl abietate known under the trade name "Abalyn." The characteristics of the compound should be chosen to ensure minimum absorption of moisture during storage, transport and application to the joint, to provide suitable lubrication for the taping process and to ensure sufficient solution in the solvent such as benzene.

After the manual construction of the joint and the fitting and plumbing of the sleeve, two nipples are fitted into the cable sheath (exterior to the plumbs of the sleeve). A nipple may also be inserted midway between these two nipples, i. e., at the centre of the joint sleeve. The technique is then similar to that for making a styrene plug in a cable.

An advantage of the present process is that the added insulation is firmly bonded to the cable insulation and the use of oil impregnated paper tapes is simplified.

The present invention may also be applied to the preparation of cable terminations as described in U. S. Patent 2,209,894 by feeding solvent into the cable end prior to the application of the polymerisable material thereto.

The provision of polymerised barriers in single core cables is a relatively simple matter since the oil solvent used to dissolve out the oil may readily be constrained to flow along the cable strand and through the dielectric, thus dissolving away sufficient oil to permit of fairly homogeneous styrenation which then provides an effective barrier after polymerisation. In the case of multi-core cables, however, the difficulty arises that the interstices or worming spaces between the laid up insulated cores provides a path of such relatively low fluid resistance that the flow of solvent tends to be to the worming spaces thus failing to remove the oil from the core dielectric on the strands.

The following method has been found successful in dealing with belted cables. The cable is treated in a similar manner to a single core cable, i. e., solvent is passed through in an attempt to replace the oil. It will soon be found that after some oil has been ejected, the solvent will come through clear, evidently due to the easy path offered by the now oil-free spaces. If now, however, the solvent is drawn off by the application of heat and vacuum, the oil which normally cannot be reached in the strands and core papers will diffuse towards the dry worming spaces under the combined influence of the forces due to gravity and capillary attraction. A further flushing of solvent will then remove this oil and the process may be repeated until sufficient is removed to permit of re-impregnation with styrene, which will then penetrate sufficiently to form an effective barrier upon polymerisation. The above method may if desired be used in connection with H-type cables (i. e., screened cores) but the diffusion of oil would in such an application of the method take rather longer than in the case of belted cables.

When applying the solvent to the cable insulation, nipples may be inserted into the cable sheath at each side of the barrier so that the solvent may be passed through the insulation from one end of the barrier to the other to dissolve out the impregnant and then after removal of the solvent an impregnant styrene or other suitable polymerisable material may be fed into the insulation. Alternatively and especially in the provision of a joint a sleeve may be provided, around the insulation having an orifice to permit the insertion of a nipple or nipples adjacent to the centre of the joint so that the solvent may be passed through the insulation from the centre to each end of the barrier.

In order to assist in driving off the solvent and dissolved impregnant and in polymerising the material to form the barrier a heating coil or coils may be provided to surround the cable sheath (e. g., in the case of a plug or termination) or a sleeve surrounding the insulation (e. g., in the case of a joint) at the position at which the barrier is to be formed. Alternatively the cable sheath or the sleeve may be directly heated by the passage therethrough of an electric current of sufficiently high amperage.

In multi-core cables it may be found advantageous to form the barrier in stages; for example in the case of a belted cable the impregnant in the core insulation and the worming spaces may be removed by repeated applications of solvent as described above, thereafter polymerisable material may be fed into the insulation and polymerised. Having formed a barrier in the core insulation and in the worming spaces as described the impregnant may be removed from the belt insulation by the application of solvent and polymerisable material may thereafter be applied thereto. In carrying out the above process the belt insulation may be removed for the length of the barrier, the first stage may then be completed and the belt insulation replaced or alternatively the belt insulation may be built up by the application of impregnated papers thereto which may then be treated for the removal of impregnant and the application of polymerisable material thereto.

The application of solvent and the removal of solvent and dissolved impregnant may be facilitated by introducing the solvent from a suitable bomb held under pressure and by applying a partial vacuum to the outlet nipple or nipples.

What is claimed is:

1. A method of preparing a liquid resisting barrier in an impregnated cable which comprises cooling the portions of the cable adjacent the part thereof in which said barrier is to be formed to render the impregnant of the cable substantially immobile, feeding a volatile solvent into the cable and causing said solvent to flow through that part of the cable insulation in which the barrier is to be formed to dissolve out a substantial part of the impregnant therefrom, allowing the solvent and dissolved impregnant to flow out of the cable, continuing feeding in solvent into the insulation until substantially pure solvent is flowing out of the insulation, heating the cable to drive off the remainder of the solvent, introducing a polymerizable material into that part of the cable from which the impregnant has been substantially removed, and thereafter polymerizing the material to form a barrier in the cable.

2. A method of providing a solid joint in an impregnated cable which comprises building up the insulation around the joint with fibrous material impregnated with a suitable compound, disposing a protective sleeve around the insulation at the joint, cooling a portion of said cable adjacent the ends of said protective sleeve to render the impregnant of said cable substantially immobile, feeding a volatile solvent into said built-up insulation and causing it to flow therethrough to dissolve out a substantial part of the impregnant, allowing the solvent and dissolved impregnant to flow out of said joint, continuing feeding solvent into the insulation until substantially pure solvent is flowing out of said insulation, heating the joint to drive off the remainder of the solvent, introducing a polymerizable material into the built-up insulation and thereafter polymerizing said material to form a solid joint in the cable.

3. A method of providing a solid termination in an impregnated cable which comprises cooling the portions of the cable adjacent the part thereof in which said barrier is to be formed to render the impregnant of the cable substantially immobile, feeding a volatile solvent into the cable insulation adjacent to the end of the cable to dissolve out a substantial part of the impregnant at that part of the cable, allowing the solvent and dissolved impregnant to flow out of the cable, continuing feeding solvent into the insulation until substantially pure solvent is flowing out of the insulation, heating the cable to drive off the remainder of the solvent introducing a polymerizable material into that part of the cable from which the impregnant has been substantially removed and thereafter polymerizing the material to form a solid termination in the cable.

4. A method of providing a barrier in an impregnated multi-core cable which comprises cooling the portions of the cable adjacent the part thereof in which said barrier is to be formed to render the impregnant of the cable substantially immobile, feeding a volatile solvent into the cable to dissolve out a substantial part of the impregnant from the fibrous insulating materials in the spaces between the cable cores, removing the solvent and dissolved impregnant from said cable, allowing impregnant from the insulation around the cores to diffuse into the space between the cores, thereafter repeating the treatment with solvent until the solvent removed from the said cable is substantially pure, heating said cable to drive off the remainder of the solvent, introducing a polymerizable material into the insulating material in the spaces and around the cores from which the impregnant has been removed and thereafter polymerizing the material to form a solid barrier in the cable.

5. A method according to claim 4 in which a nipple is provided at each side of said barrier characterized in that the solvent is introduced through a nipple disposed at one side of the barrier and is drawn off through the nipple at the other side of the barrier.

6. A method according to claim 4 characterized in that the solvent is introduced centrally of the barrier and is drawn off at each side of the barrier.

7. A method of preparing a liquid resisting barrier in an impregnated cable which comprises cooling the portions of the cable adjacent the part thereof in which said barrier is to be formed to render the impregnant of the cable substantially immobile, feeding a solvent into the cable and causing said solvent to flow through that part of the cable insulation in which the barrier is to be formed to dissolve out a substantial part of the impregnant therefrom, allowing the solvent and dissolved impregnant to flow out of the cable, continuing feeding in solvent into the insulation until substantially pure solvent is flowing out of the insulation, introducing a polymerizable material into that part of the cable from which the impregnant has been substantially removed, and thereafter polymerizing the material to form a barrier in the cable.

8. A fluid stop occupying a predetermined limited length intermediate the end sections of a finished, substantially intact, sheathed, multi-conductor cable having conductors initially insulated with laminated material impregnated with insulating fluid and having filler strips in the channels between conductor insulation, comprising a solid polymer formed in situ from a monomer having the general formula

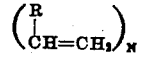

and bonded to all of the non-fluid, insulating and conducting materials originally within the sheath and filling all voids therein.

9. A method of forming a barrier in stages in impregnated multi-core cables which comprises cooling a portion of the cable adjacent the barrier, feeding a volatile solvent into the cable to dissolve out a substantial part of the impregnant from the fibrous insulated materials in the spaces between cable cores, removing the solvent and dissolved impregnant from the cable, then after a period for diffusion of core impregnant into spaces between cores, repeating said feeding and removing operations until the solvent removed from said cable is substantially pure, driving off the remainder of the solvent by heat application, introducing a polymerizable material into the insulating material in the core spaces and around the cores from which the impregnant has been removed, then polymerizing the material and then repeating said barrier-forming operation respecting the belt insulation.

JOHN KRAUSS WEBB.